Aug. 24, 1926. 1,597,188
M. F. GAUNT
HOSE SUPPORTER
Filed August 17, 1925
Fig. 1.
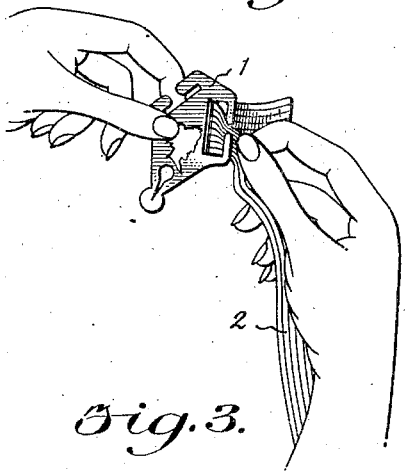
Fig. 2.
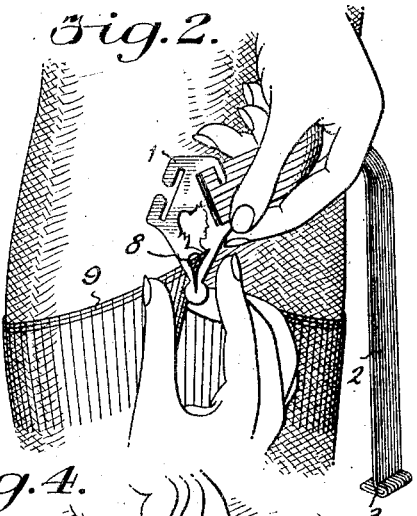
Fig. 3.
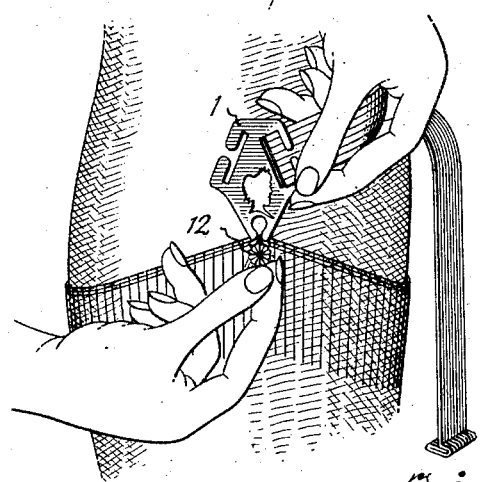
Fig. 4.
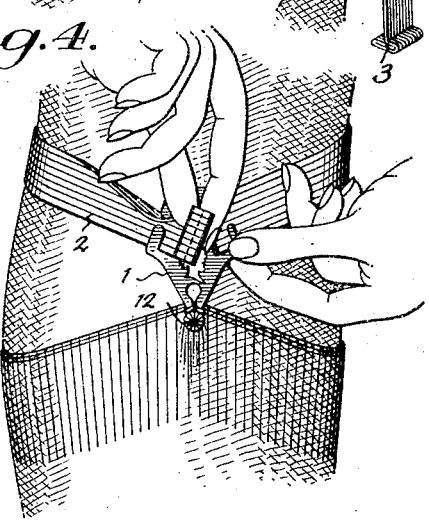
Fig. 5.
Fig. 6.
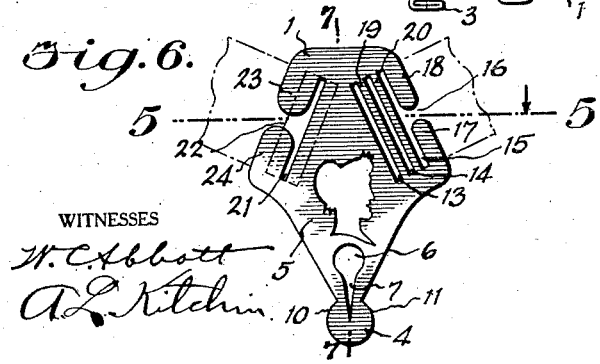
Fig. 7.
WITNESSES
W. C. Abbott
A. L. Kitchin
INVENTOR
MARTIN F. GAUNT
BY Munn &co
ATTORNEYS Patented Aug. 24, 1926.

1,597,188

UNITED STATES PATENT OFFICE.

MARTIN FOX GAUNT, OF DAYTON, OHIO.

HOSE SUPPORTER.

Application filed August 17, 1925. Serial No. 50,802.

This invention relates to a supporter for hose and other purposes and has for an object to provide an improved construction adapted to be used either with elastic or inelastic bands in such a manner that the same may be easily and quickly engaged and disengaged and adjusted to various sizes.

Another object of the invention is to provide an improved simplified supporter for hose wherein both ends of the band may be quickly mounted in place or removed and may be adjusted while in position.

A still further object of the invention is to provide a hose supporter wherein the encircling band or member is positively locked to the hose engaging member when the parts are in operative position.

A still further object of the invention is to provide a hose supporter in which there is provided a hose engaging member of comparatively stiff material associated with an encircling band in such a manner that the band may be quickly mounted in place at any time and quickly adjusted while the member engaging the hose may be quickly and effectively connected to the hose in such a manner as to properly support the hose without tearing the same.

In the accompanying drawing—

Figure 1 is a perspective view of a supporter disclosing an embodiment of the invention, the same being shown held by one hand with the band being applied by the other hand.

Figure 2 is a view substantially in elevation showing how the supporter is first positioned on the hose.

Figure 3 is a view similar to Figure 2 but showing the supporter completely fixed or engaged with the hose.

Figure 4 is a view similar to Figure 3 but showing the band being finally applied.

Figure 5 is a sectional view through Figure 6, approximately on line 5—5, an encircling band being shown in connection therewith.

Figure 6 is an enlarged elevation of the hose engaging member, part of an encircling band being shown in dotted lines.

Figure 7 is a sectional view through Figure 6, approximately on line 7—7.

Referring to the accompanying drawing by numerals, 1 indicates the hose engaging member which may be of metal, celluloid or other desired material which is comparatively stiff. Associated with member 1 is an encircling band 2 which may be an elastic or an inelastic band. The band 2 is folded back upon itself and stitched to produce an enlarged or folded end 3, which acts as a stop or anchor when the band is in operative position as indicated in Figure 5. The hose engaging member 1 is provided at the lower end with a head 4 which is round like a disk except for the part which joins the body 5. Immediately adjacent the head 4 is a comparatively large opening 6 which merges into a tapering opening 7, said opening being substantially V-shaped and extending to near the center of head 4. This opening is adapted to receive a section 8 of the hose 9 when the supporter is being applied as shown in Figure 2. This section 8 of the hose is then pulled downwardly so that it will slide or move over the inclined surfaces 10 and 11 of head 4 and become pinched in the end of the opening or slit 7 and at the same time become looped over the head 4 so as to present a hood 12 as shown in Figure 3. By pulling the parts down and looping the same over the head 4, the hood 12 is formed and, consequently, the strain from the hose is distributed substantially over the entire head 4 whereby danger of tearing the hose is reduced to a minimum while the hose is firmly engaged. Arranged above the head 4 and at one side are slots 13, 14, and 15, slot 15 having an opening 16 whereby there are presented arms 17 and 18. By reason of the slots there are also formed what may be termed holding bars 19 and 20. Arranged at the opposite side of the body 5 to the bars 19 and 20 and at an angle thereto, is a slot 21 merging into an opening 22 whereby comparatively thickened arms 23 and 24 are presented. When the band 2 is mounted in place, the same is extended through the various slots 13, 14 and 15 as shown in Figure 5 whereby a substantially locked structure is provided. After this has been done and the hose engaging member 1 is mounted in position as shown in Figure 3, the opposite end of the band 2 is grasped and inserted as shown in Figure 4. When the end 3 is released it quickly assumes the position shown in Figure 5 and if the band is then not sufficiently tight the end 25 may be grasped and pulled until the desired constriction is secured. It will be noted that the method of fixing the band through the three parallel slots 13, 14 and 15 gives it a positive attachment, yet, because of the open bar or arms 17 and 18, a quick and easy release of the band may be secured at any time. It is also noted that by this construction and arrangement, both constrictive and counterconstrictive adjustments can be made while the garter is in place on the leg.

The single slot 21 is designed to receive the stitched or enlarged end 3 of the encircling band, the open bar or the arms 23 and 24 permitting the easy and quick attachment of the band. It will be observed that after the band is properly engaged in slot 21, the enlarged or stitched end 3 is drawn against the body 5 of member 1 and is positively secured and cannot be detached until the end 3 is lifted free from member 1 and the band drawn back away from the rigid member whereupon the band may be pulled out through the opening 22.

What I claim is:

1. A hose supporter, comprising a body formed with a hose engaging member and an encircling band, said band being formed with an enlargement at one end formed of several folds of the encircling band with stitching for holding the folds together and said hose engaging member being provided with a plurality of spaced slits through which one end of said band is adapted to be passed when the device is in use, and an oppositely positioned slit having an opening through which the other end of the band is inserted and adjusted until said enlargement engages flatwise against the hose engaging member.

2. A hose supporter, comprising an encircling band and a hose engaging member, said encircling band having one enlarged end and one straight end, said hose engaging member being formed with band engaging means on the respective sides, one of said band engaging means consisting of a pair of arms having a space therebetween, said arms being adapted to receive the end of the band having the enlarged end, the opposite band receiving means consisting of a plurality of spaced bars adapted to have the straight end of the band entwined therein.

3. In a hose supporter, a body provided with a pair of arms for receiving one end of an encircling member, said arms extending toward each other with an opening therebetween, said arms being also spaced from said body for forming a slit through which said encircling member extends, and a plurality of slits formed with spaced bars, said slits accommodating the opposite end of said encircling member.

4. In a hose supporter, a body provided with a pair of spaced arms for receiving one end of an encircling member and a plurality of slits on the opposite side of the body forming a pair of spaced bars and a pair of spaced arms, said slits and the opening between the arms being adapted to receive the opposite end of said encircling member, said opposite end being threaded through said slits in such a manner as to permit a ready adjustment of the band as to length at any time, and means extending from one end of the body for interlocking with the hose.

5. In a hose supporter, a body provided with means near one edge for receiving one end of an encircling band and a plurality of slits near the opposite edge for receiving the opposite end of said encircling band, said slits being parallel and forming a plurality of spaced bars and a plurality of arms, said arms extending toward each other with a space therebetween, and means forming part of said body for interlocking with a hose.

6. A hose supporter, comprising an encircling band and a hose engaging member, said band being formed with one enlarged end and said hose engaging member being formed with a body having at one place a substantially round head and at a spaced distance therefrom openings for receiving said band, said openings being arranged on opposite sides of the body and so located as to present a pair of large arms at one end of the body, a pair of bars and a pair of arms on the other end of the body, said arms being located to interlock with the respective ends of said band for holding the band in any adjusted position while said head acts as means for engaging and supporting the hose.

7. In a hose supporter, means for engaging and supporting a hose, said means including a body having a hose interlocking head and means for receiving and holding in place an encircling band, said means comprising a slot on one edge, said slot opening at a central point whereby a pair of arms is presented, said means also including three parallel slots near the opposite edge of the body, one of said slots opening at the center for presenting a pair of arms, said slots by reason of their position also presenting a pair of parallel bars, said slots being adapted to receive the respective ends of the encircling band and hold the same in different adjusted positions.

MARTIN FOX GAUNT.